United States Patent
Montgomery

(10) Patent No.: US 9,772,439 B2
(45) Date of Patent: Sep. 26, 2017

(54) THIN BACKLIGHT WITH REDUCED BEZEL WIDTH

(71) Applicant: Sharp Kabushiki Kaisha, Osaka (JP)

(72) Inventor: David James Montgomery, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 34 days.

(21) Appl. No.: 15/016,963

(22) Filed: Feb. 5, 2016

(65) Prior Publication Data
US 2017/0227703 A1 Aug. 10, 2017

(51) Int. Cl.
F21V 7/04 (2006.01)
F21V 8/00 (2006.01)

(52) U.S. Cl.
CPC ............ *G02B 6/0068* (2013.01); *G02B 6/008* (2013.01); *G02B 6/0021* (2013.01); *G02B 6/0055* (2013.01); *G02B 6/0013* (2013.01); *G02B 6/0023* (2013.01); *G02B 6/0075* (2013.01)

(58) Field of Classification Search
CPC .. G02B 6/0013; G02B 6/0023; G02B 6/0068; G02B 6/0021; G02B 6/0028; G02B 6/0055; G02B 6/0075; G02B 6/008
See application file for complete search history.

(56) References Cited

U.S. PATENT DOCUMENTS

| | | | |
|---|---|---|---|
| 6,935,764 B2 | 8/2005 | Choi et al. | |
| 6,951,401 B2 | 10/2005 | Van Hees et al. | |
| 7,688,400 B1 * | 3/2010 | Schellhorn | G02B 6/00 349/65 |
| 8,451,398 B2 | 5/2013 | Mizuuchi et al. | |
| 8,755,007 B2 | 6/2014 | Momose | |
| 8,911,133 B2 | 12/2014 | Sato et al. | |
| 2005/0180165 A1 | 8/2005 | Sado et al. | |
| 2006/0078267 A1 * | 4/2006 | Cha | G02B 6/0068 385/146 |
| 2006/0255346 A1 | 11/2006 | Kunimochi | |
| 2007/0147079 A1 * | 6/2007 | Wu | G02B 6/002 362/612 |
| 2007/0177070 A1 * | 8/2007 | Liu | G02B 6/0016 349/61 |
| 2008/0112183 A1 * | 5/2008 | Negley | G02B 6/0011 362/555 |
| 2009/0015753 A1 | 1/2009 | Ye | |

(Continued)

FOREIGN PATENT DOCUMENTS

| | | |
|---|---|---|
| CN | 202210196 U | 5/2012 |
| JP | 2006-244825 A | 9/2006 |

(Continued)

*Primary Examiner* — Alexander Garlen
(74) *Attorney, Agent, or Firm* — Renner, Otto, Boisselle & Sklar, LLP

(57) ABSTRACT

A backlight includes a first lightguide having a first portion and a second portion, wherein the second portion is dimensioned smaller that the first portion so as to form a rim along at least a part of the first light guide. At least one light source is positioned under the rim and separated from the first lightguide by a space, where a majority of the light emitted by the at least one light source being along a first axis of the at least one light source. The at least one light source is arranged to position the at least one axis at an angle away from a center of the lightguide in a plane parallel to the rim.

18 Claims, 16 Drawing Sheets

(56) References Cited

U.S. PATENT DOCUMENTS

| | | | |
|---|---|---|---|
| 2009/0109672 A1* | 4/2009 | Lai | G02B 6/0078 362/238 |
| 2009/0180299 A1* | 7/2009 | Ito | G02B 6/0018 362/619 |
| 2010/0259470 A1* | 10/2010 | Kohtoku | G02B 6/0021 345/102 |
| 2011/0058124 A1* | 3/2011 | Chien | G02B 6/002 349/64 |
| 2011/0090423 A1 | 4/2011 | Wheatley et al. | |
| 2011/0109840 A1* | 5/2011 | Masuda | G02B 6/0018 349/62 |
| 2012/0044715 A1* | 2/2012 | Tsai | G02B 6/002 362/612 |

FOREIGN PATENT DOCUMENTS

| | | |
|---|---|---|
| JP | 2009-259516 | 11/2009 |
| JP | 2010-040246 A | 2/2010 |
| JP | 2010-056089 A | 3/2010 |
| JP | 4552095 B2 | 9/2010 |
| WO | WO 2014/038117 | 3/2014 |

* cited by examiner

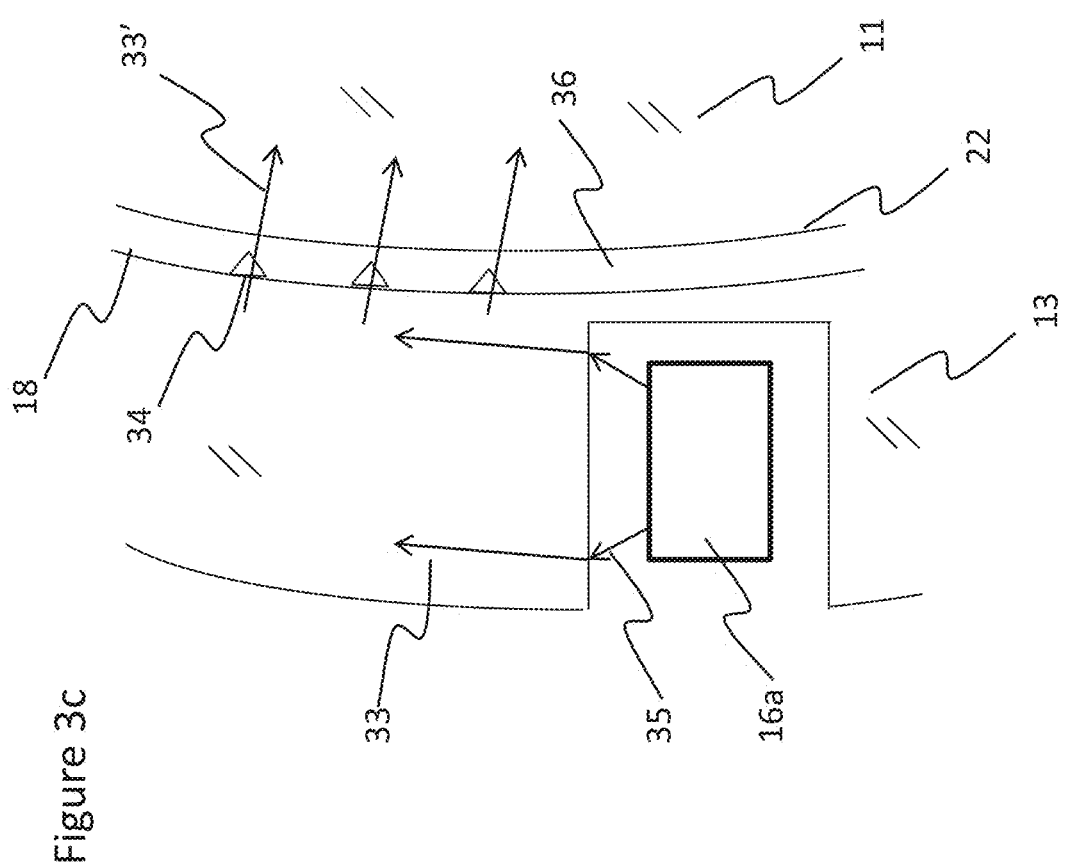

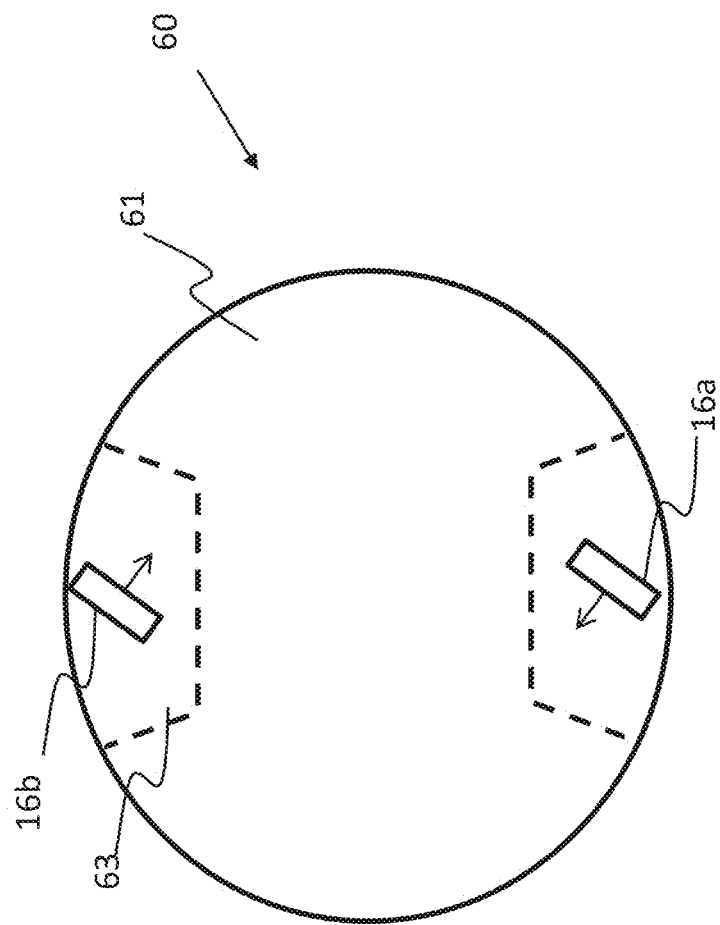

THIN BACKLIGHT WITH REDUCED BEZEL WIDTH

TECHNICAL FIELD

A device in accordance with the present invention relate to mobile style backlights that use lightguides in order to reduce thickness and also other backlights for use with lightguide plates. In this case side light sources are hidden, meaning a minimum bezel width of 2 millimeters or more. The device in accordance with the present invention can reduce the bezel width to significantly less than 1 mm.

BACKGROUND ART

There are many methods for reducing bezel width in the prior art. Direct view backlights, where LEDs are distributed behind an LCD and shine directly through, in principle have a very low bezel width but in general are too thick and expensive for a small area application. Such small area applications (of display sizes approximately 15 inches in diagonal or less) typically use lightguides with patterned extraction features and edge emitting LEDs to illuminate the LCD. This enables less LEDs to be required and very thin form factors. However the area around the LED must be obscured as the high brightness and non-uniformity of this area would mean a display could not be positioned over this area. The area around the LED incorporates the flat panel connector electronics, the LED itself and the mixing area of the lightguide, where it is not possible to achieve uniformity by extraction feature control alone. This obscuration would be the limiting bezel width, meaning that a black area of at least 2-3 mm exists at the LED end of the lightguide.

Reducing this bezel area to create more usable display area for the device size has been a source of study. A cross section of the types of prior art are summarized below:

JP 4552095 (Stanley Electric) positions the LEDs at the corner of the lightguide where the natural spread of the LED light better fills the lightguide area.

U.S. Pat. No. 8,451,398 (Panasonic), U.S. Pat. No. 8,755,007 (Seiko Epson) and JP2010056089 (Sharp) describe reflecting structures on the far side of the lightguide that efficiently reflect light back in order to improve uniformity near the LEDs.

U.S. Pat. No. 8,911,133 (Opto Design) utilizes an airguide with LEDs illuminating an airgap between highly reflecting areas and an array of apertures are used to achieve uniformity. This system is relatively thick and proposed mainly for lighting applications.

US 20090015753 (Wintek) and U.S. Pat. No. 6,935,764 (Samsung) describe structures on the area near the LEDs molded into the lightguide in order to better spread the light to reduce the mixing area.

US20050180165 (Seiko Instruments) describe a secondary lightguide member that makes the LED illumination more uniform into the main lightguide.

The above-referenced documents only reduce the mixing width in the lightguide, though they do not attempt to reduce the bezel width to less than that of the LEDs themselves.

A number of prior-art references such as US20110090423 (3M) and JP2010040246 (Seiko Epson) attempt to thin the structure by adding lightguide elements to an LED array as used in a direct view backlight. This is to reduce the thickness of a direct view system in order to achieve a thinner unit.

Attempts to hide the LEDs on an edge based system include U.S. Pat. No. 6,951,401 (Philips) and US20060255346 (Minebea) where the LEDs and lightguide are wrapped around beneath the main lightguide and secondary lightguides are used underneath the main lightguide.

Prior art such as CN202210196 (Shenzen Huaxing) and JP2006244825 (Sharp) use patterned filters above the LEDs in order to reduce the non-uniformity.

SUMMARY OF INVENTION

The existing prior art for hiding the edge lit LEDs involves one of three different technologies. The first is hiding the LEDs under the lightguide with secondary lightguide optics. This is considered best only for monitors and larger-sized displays because of the significant thickness increase. The second utilises a direct view array with intermediary optics/lightguides to reduce the thickness. Again this works best for larger displays. For smaller displays the LEDs are too bright, and hence too few to get good uniformity at low enough thickness. The third approach uses a patterned shield above the LEDs to make it appear as a uniform area for the liquid crystal display panel LC. However this approach requires patterned optics that are hard to fabricate and the tolerance of alignment is very difficult to achieve due to the extreme non-uniformity in that area.

A problem with having the LEDs under the active area is the very bright area immediately in front of the LED and the lack of control of light around it. The device in accordance with the present invention serve to provide a solution that can be used with small displays (especially very small displays that are less than 2 inches across) using a lightguide based solution and standard technology. In addition, standard edge lit LEDs can be used with minimal increase in thickness and without a high tolerance requirement for alignment.

According to one aspect of the present invention, a backlight includes: a first lightguide having a first portion and a second portion, wherein the second portion is dimensioned smaller that the first portion so as to form a rim along at least a part of the first light guide; and at least one light source positioned under the rim and separated from the first lightguide by a space, a majority of the light emitted by the at least one light source being along a first axis of the at least one light source, wherein the at least one light source is arranged to position the at least one axis at an angle away from a center of the lightguide in a plane parallel to the rim.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features:

FIG. 1b is an exploded view of the embodiment of FIG. 1a.

FIGS. 3a, 3b and 3c illustrate arrangement of LEDs near a lightguide surface of the device according to FIG. 1.

FIGS. 6a and 6b illustrate partial rim lightguide structures in accordance with another embodiment of the invention.

DESCRIPTION OF REFERENCE NUMERALS

Figure 1A:
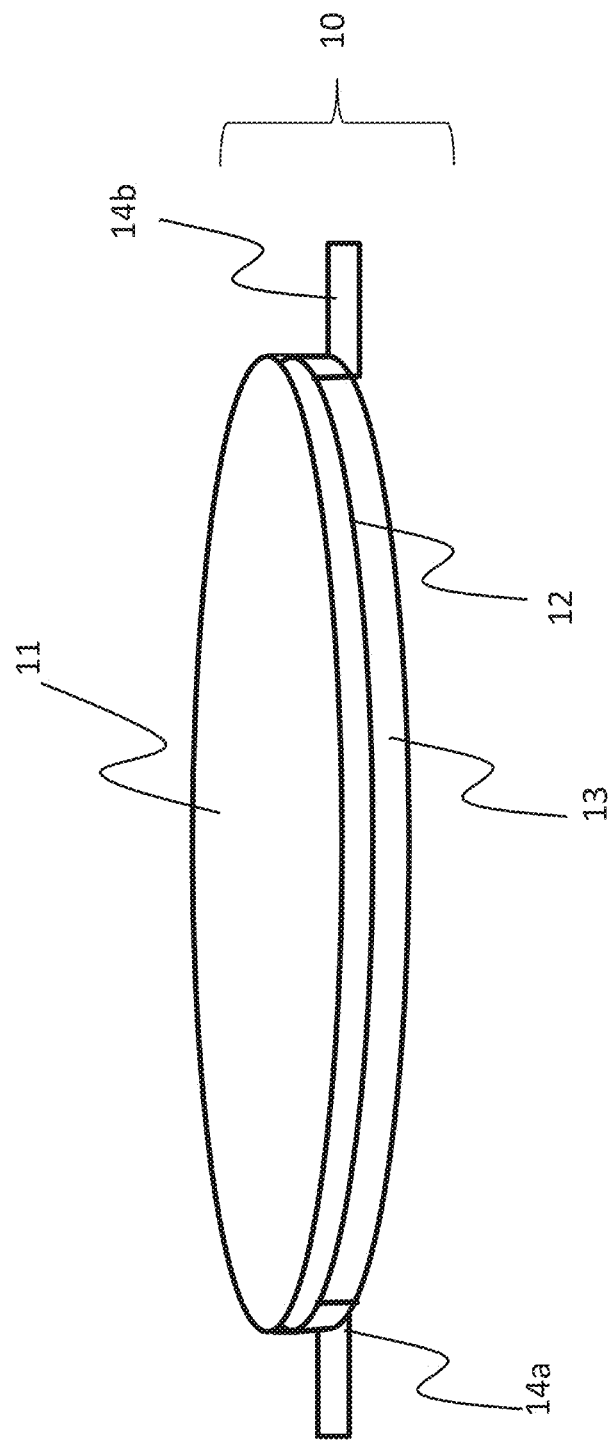
FIG. 1a is an isometric view of a device in accordance with and embodiment of the invention.

10: The first embodiment and overview of the invention
11: The main lightguide
12: The annular rim reflector
13: The secondary lightguide
14a, 14b: FPC connections to the LEDs
15: The lower reflector
16a, 16b, 16c, 16d, 16e: Opposing LEDs
17a, 17b: Cutaway sections of the secondary lightguide for the LEDs
18: Extraction features on the inner ring of the secondary lightguide
20: The centre cylindrical section of the main lightguide
21: The rim section of the lightguide
22: The inner in-coupling surface on the main lightguide
31: Illumination pattern when the LED is directed directly at the lightguide
32: Illumination pattern when the LED is angled
33: Illumination in the secondary lightguide by the LED
33': Illumination extracted from the secondary into the main lightguide
34: Extraction features in the secondary lightguide
35: The space between the LED and secondary lightguide
36: The space between the secondary lightguide and the main lightguide
50: The main embodiment without a secondary lightguide, only an air gap.
51: Edge reflecting tape
60: Backlight with a partial rim
61: Main lightguide with a partial rim
62: Upper reflector for the partial rim backlight
63: Cutaway section for LED in main lightguide with a partial rim
70: Cylindrical backlight with single LED
71: Secondary lightguide with single LED cutaway
72: Inside extraction features for secondary lightguide
73: Cutaway section of secondary lightguide for single LED
80: Rectangular lightguide with opposing LEDs
81: Main rectangular lightguide
82a, 82b: Rims for a rectangular lightguide
83a, 83b: Top rim reflectors for the rectangular lightguide
85a, 85b: Secondary lightguides prisms for the rectangular lightguide
85a', 85a'', 85a''': Alternative secondary lightguide designs
86: Lower reflector for the rectangular lightguide
90: Rectangular backlight with single array of LEDs
91: Rectangular lightguide with single rim
92: Rim of single-rim lightguide
93: End reflector of single-rim rectangular lightguide
100: V shaped in-coupling surface to the secondary lightguide
101: Multiple V shaped in-coupling surfaces to the secondary lightguide
110: An array of independently controllable rectangular low bezel rectangular structures
111: Incoupling surface for the main lightguide
112: Edge reflecting structure on the edge of the lightguide elements
120: An array of independently controllable rectangular low bezel structures with a continuous lightguide structure
121: Continuous lightguide across multiple LED structures
122: boundary between active areas covered by each LED

DETAILED DESCRIPTION OF INVENTION

In one embodiment in accordance with the present invention is intended for a circular display for wearable applications. This includes a main lightguide in the shape of an inverted cylindrical "top hat", which includes a main cylindrical body and a wider circular rim. Directly under the rim is positioned an opaque reflector which may or may not be in optical contact with the rim.

Under the reflector, but not lower than the main body thickness, are positioned LEDs with a gap between the LED and the main lightguide body. The LEDs are positioned on opposing sides of the lightguide, or in a regular arrangement around the lightguide. A gap between the LED and main lightguide body may be filled with a secondary ring lightguide that fits under the rim and reflector but is not thicker than the main body of the lightguide. Areas can be cut away from the ring in order to accept the LED positions.

The LEDs can be angled so that they do not point radially into the centre of the lightguide, for example they can point azimuthally around the ring of the secondary lightguide. The inner cylindrical surface can be cut an array of vertical linear extraction features to couple light from the secondary to the main lightguide. Acceptable features may exist in the main lightguide. Extraction features and top sheets of a known type can be used on the top surface of the main lightguide, which is flat and continuous with the rim. A lower reflecting film positioned beneath the lightguide and LEDs also may be used.

A thickness of this unit is governed by the thickness of the main body of the lightguide. The LEDs are contained between opaque reflectors to minimise efficiency loss and to prevent their visibility, hence alignment tolerance is acceptable. Light from opposing LEDs illuminates the rim above the opposing LEDs allowing a uniform top surface view.

Leaking light from the interface with the main lightguide is minimised by the fact the LED does not shine directly onto the nearest part of the lightguide, it is spread over a wider area (as with mixing bar approaches) allowing better uniformity.

Advantages between the device in accordance with the present invention and the prior art include:
- The LEDs are completely hidden and light is only out-coupled over a large area, meaning that any leaked light is at a much lower intensity creating less non-uniformity.
- The lightguide is a single unit and does not require LEDs beneath the lightguide. This it is still relatively thin.
- The number of LEDs required would be the same as in a lightguide backlight and so costs are not increased
- Uses the same extraction and optical sheets so angular distribution and efficiency is unaffected
- Bezel width, using a device in accordance with the present invention, can in principle only be the lightguide mounting width, which for small wearables displays can be as low as 0.1 mm and less than 0.5 mm for tablets/smartphones.

Further embodiments are as follows, described as differences over the first embodiment:

There does not need to be a secondary lightguide; the gap between the LED and main lightguide can be filled with air if the reflectivity of the surfaces is good enough (for example with ESR film).

The rim of the main lightguide where the LEDs are located may have shaped cut away areas, instead of a continuous circular rim.

There may be only one LED, though it would be necessary for either reflective structures opposite the LED or the secondary lightguide to extract light around the full circle.

The lightguide can be rectangular. In this case the rim can be on at least two opposing sides. LEDs can be positioned in a line under the rims with a secondary lightguide with side prism structures to accept the LED light at an angle from the LEDs.

The LEDs may be angled in different directions.

The opposing side may not have LEDs but simply reflecting structures so that the rim area is properly illuminated.

Figure 1B:
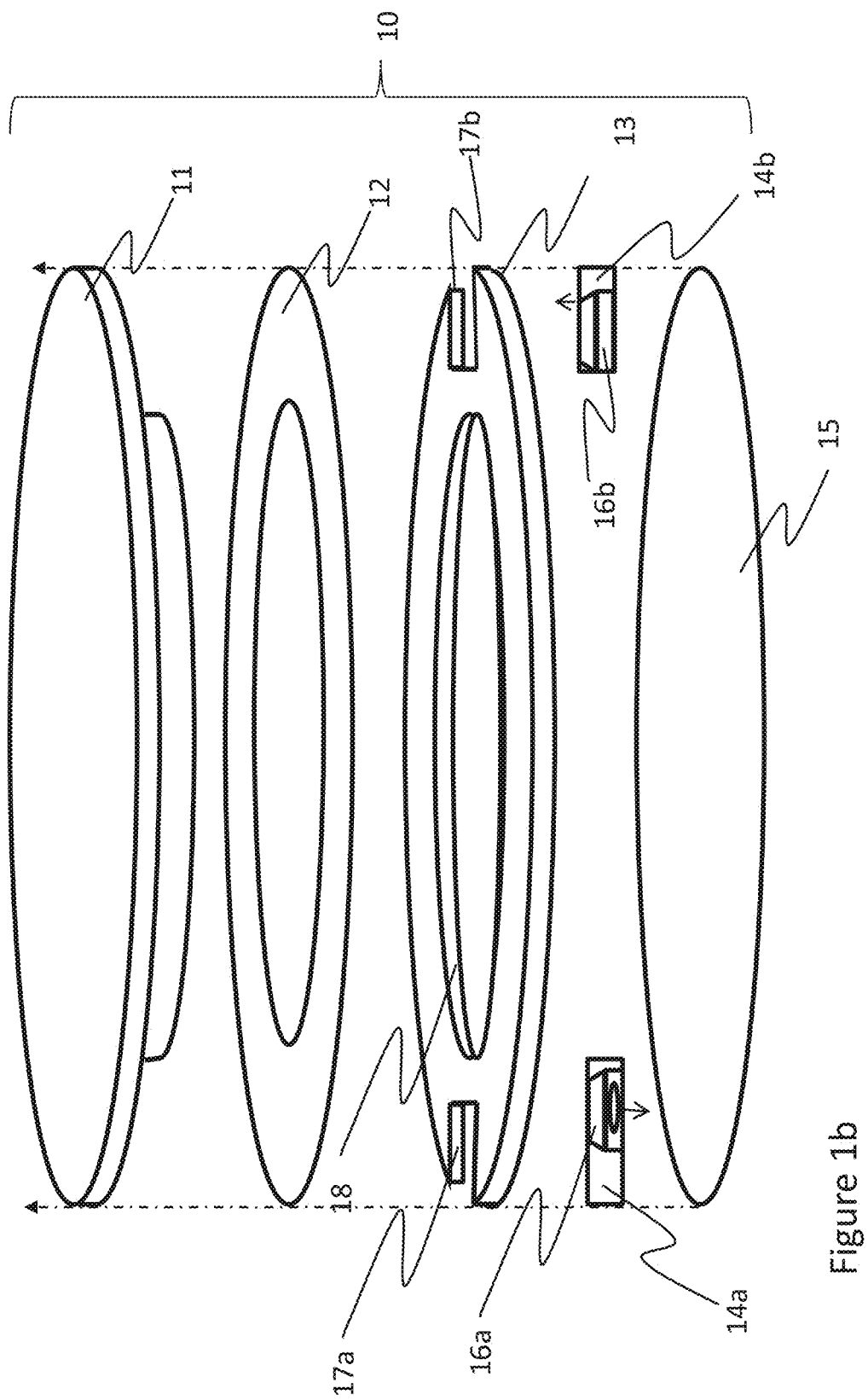

A device in accordance with a first embodiment of the invention is described in the coming paragraphs and is shown in FIGS. 1a and 1b. FIG. 1a shows a backlight 10 in its full configuration. FIG. 1b shows an expanded view of the backlight 10 identifying the consistent parts. The backlight 10 as shown in FIG. 1b includes the following elements. The first element is the main lightguide, 11, in the shape of an inverted "top hat", which includes two concentric cylinders of different radii. The thicker element has the smaller radius and is underneath the other cylinder. Both cylinders are in optical contact and can be made as one piece as a single element. Though this is assumed in the subsequent description, the main lightguide 11 can be made from different materials. The main lightguide 11 has extraction features of a known type on the top (larger radius surface).

Figure 2:
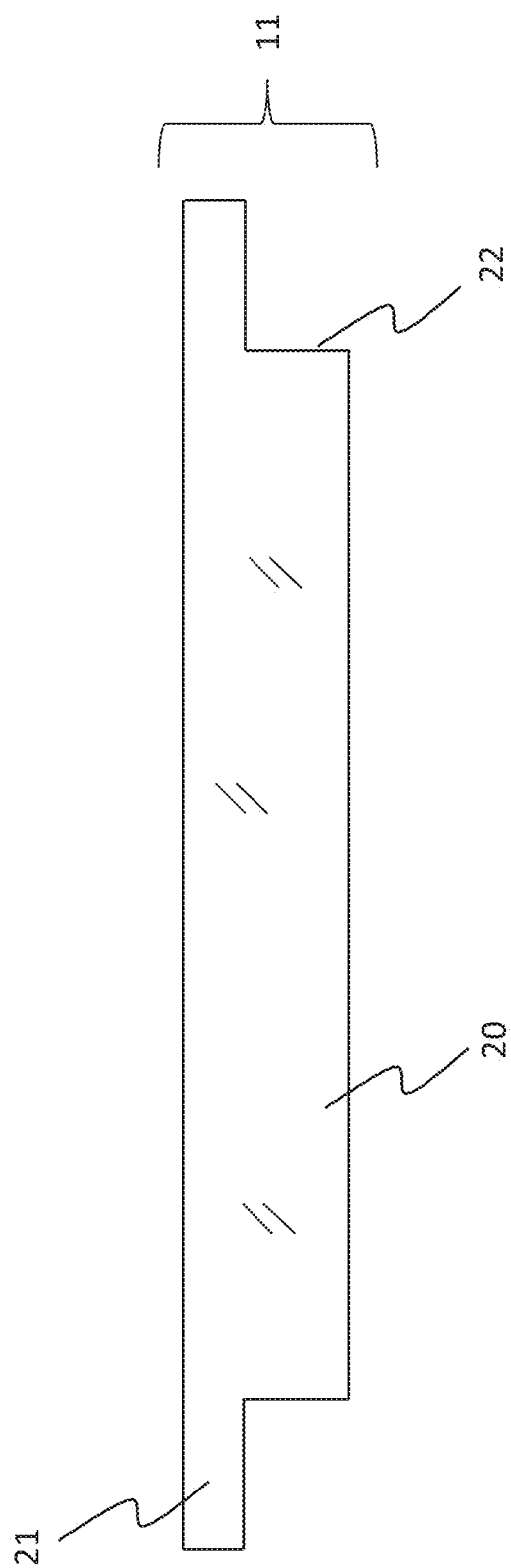
FIG. 2 is a side view of a main lightguide of the device according to FIG. 1.

FIG. 2 illustrates in more detail the main lightguide 11 as a cross section along a diameter. The lower radius main body 20 and the rim section 21 are shown to illustrate the subsequent discussion. The inner cylindrical surface of the lower radius section 22 will be referred to as the in-coupling surface.

Although not shown it is assumed that the backlight includes known optical sheets such as diffusers and optical brightness enhancement films in a known arrangement. These elements do not form part of the invention and thus are not described in the subsequent description, but they are a part of the final backlight and are assumed to be present.

The next component in FIG. 1b is an annular ring reflector 12 (a first reflector), which is designed to fit under rim section 21 of the main lightguide 11. This component may be a highly reflective sheet such as an enhanced specular reflector (ESR) film or a reflective layer on the lower rim surface made from an evaporated layer of aluminium or silver or other specular or diffusely reflective surface. This component should be reflective on both sides.

The next component is a lower reflective sheet 15 (a second reflector) of a similar type to the annular ring reflector, though it is not necessary that they are the same type. The lower reflector is circular and positioned beneath the main lightguide 11. The radius, however is substantially the same as the larger radius segment of the lightguide 11, though it should be at least as far as the emitting areas of the LEDs 16a, 16b.

The next component is a secondary annular lightguide 13 (a second light guide) that is designed also to fit around the main part of the main lightguide 11 an under the rim section 21 and upper reflecting layer 12. The secondary lightguide's inner surface 18 is designed to be in near-contact (though not optical contact) with the inner in-coupling surface 22 of the main lightguide 11 in FIG. 2. This inner surface 18 has extraction features in a regular or non-regular manner to out-couple light in the secondary lightguide into the main lightguide. The secondary lightguide 13 also has cutaway sections 17a and 17b on opposing sides of the cylinder that accept two LEDs 16a and 16b. The cutaway sections serve as an in-coupling surface into the secondary lightguide for light from the LEDs.

The final components are the LEDs 16a and 16b which are positioned at opposing sides of the cylinder and placed in the secondary lightguide cutaway sections 17a and 17b. The electrical connectors, such as FPC connectors, are 14a and 14b. In the embodiment shown in FIG. 1b the LEDs 16a and 16b are not pointing radially inwards towards the center of the main lightguide cylinder but at an angle. One such angle is purely azimuthally, at 90 degrees to the radial direction (as shown in FIG. 1b) in opposing directions, but any angle away from the radial and any relative orientation is possible. For example, the LEDs may emit a majority of light along a first axis, and the LEDs may be arranged to position their respective axes at an angle away from a center of the lightguide in a plane parallel to the rim.

It is understood that "LED" not only refers to light emitting diodes, but can refer, without loss of generality to groups of more than one LED in approximately the same location or other known light sources or groups of light sources that could take the place of LEDs, such as lasers, fluorescent tubes or other such light sources.

Figure 3A:
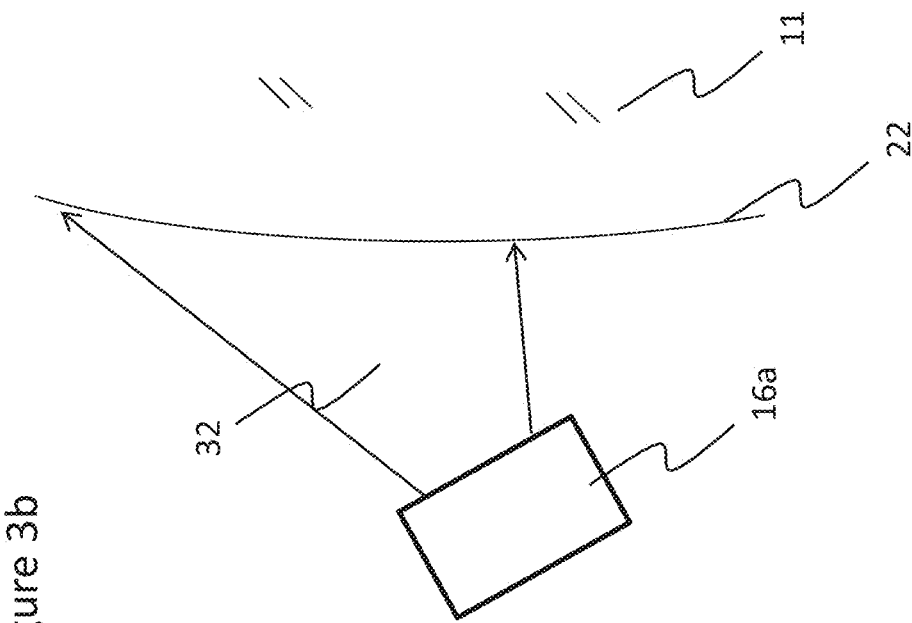
Figure 3B:
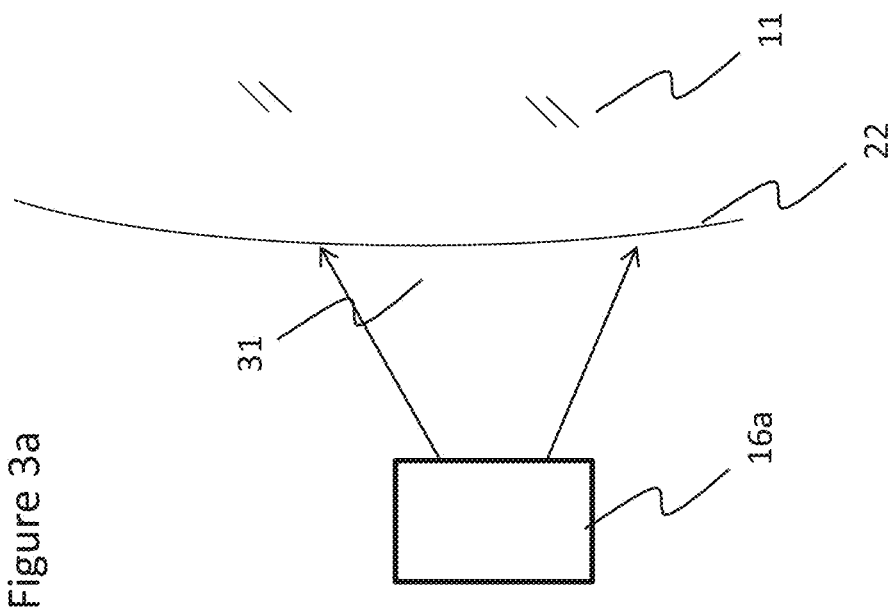

A purpose for the angle of the LEDs is shown in FIGS. 3a and 3b. FIG. 3a shows the case where the LED 16a shines radially into the main lightguide 11 through the surface 22. The light density 31 at this surface 22 is given by the brightness and area illuminated on the surface. In this case the brightness is very high. Any inaccuracy in the positioning of the top reflector 12 or any scattering or roughness in the in-coupling surface 22 will lead to significant non-uniformity which would be difficult to deal with without a loss in efficiency.

One embodiment to address the non-uniformity issue is shown in FIG. 3b. The LED 16a is angled relative to the in-coupling surface 22 providing the light density 32 at the surface 22, which lowers the energy density. Thus the uniformity loss and hence efficiency loss is reduced.

Another embodiment for addressing the non-uniformity issue is shown in FIG. 3c. This embodiment utilizes a secondary lightguide 13, and the LED 16a in-couples the light 33 into the secondary lightguide 13. The light propagates by total internal reflection Extraction features 34 on the inner surface 18 parallel to the main lightguide incoupling surface 22 extract light 33' from the secondary lightguide 13 over a very large area 36 compared to that in FIG. 3a. Thus the loss in efficiency should be minimal by any inaccuracy of fabrication of this section. The small gap 35 between the LED 16a and the secondary lightguide 13 does have a high light density but is fully hidden by the opaque upper reflecting layer.

Figure 4B:
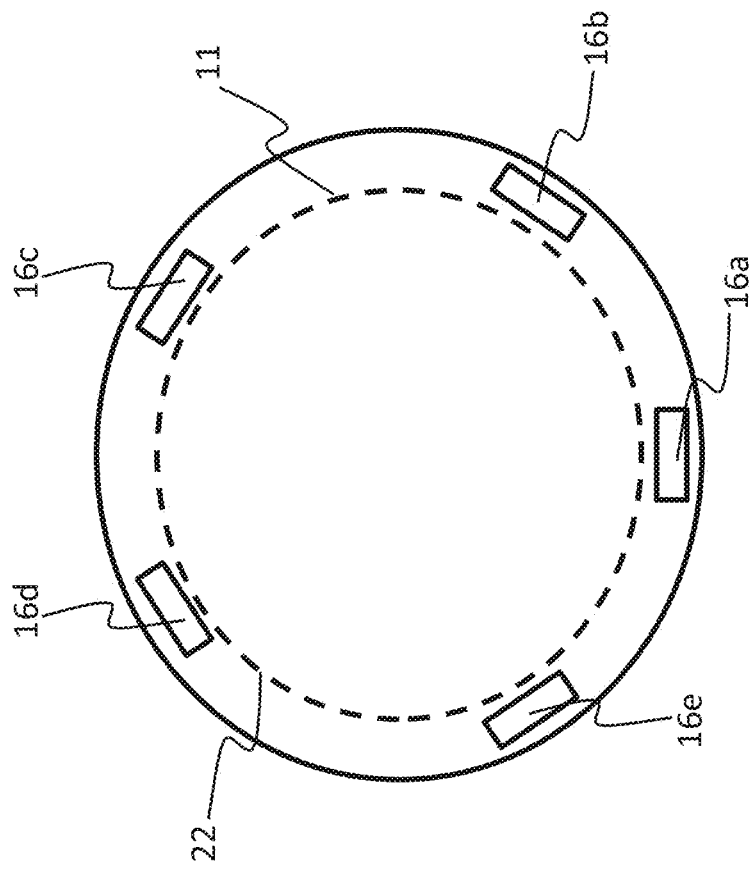
FIGS. 4a and 4b illustrate circular arrangements of LEDs around the device according to FIG. 1.
Figure 4A:
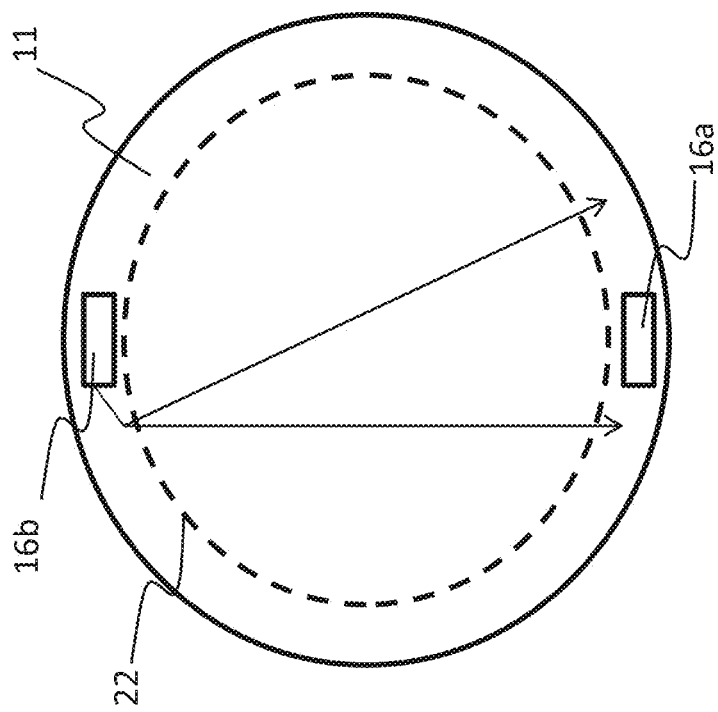

In another embodiment, the arrangements of two LEDs 16a and 16b are opposing, i.e., opposite each other on each side of the main lightguide, as shown in FIG. 4a. In this case the two opposing LEDs in couple light into the main lightguide 11 and the light propagates into the rims above the opposing LEDs, thus by known methods of extraction feature density optimization the whole top surface can appear uniform, which hides the LEDs underneath the rims. The effective bezel width is then only the width of the frame holding the lightguide in place and can be as little as 0.1 mm.

If more than two LEDs are required, they can be grouped with the existing LED or distributed around the circumference such that two are always opposing. If an odd number is required, the LEDs 16a to 16e can be distributed evenly around as shown in FIG. 4b. There will be sufficient light opposing each LED to provide sufficient light for the rim illumination.

In the above embodiments the LEDs are effectively hidden while maintaining efficiency and having a very low bezel width. The increase in thickness over a typical backlight is simply the thickness of the rim and the upper reflecting layer and can in theory be as little as 0.15 mm, much less than if the LED had been hidden by coupling to a secondary lightguide underneath the primary, and without requiring any turning and recoupling optics which would increase the bezel width.

Because of the spreading of the light in the secondary lightguide 13, alignment and tolerance for surface roughness is significantly reduced to a level that is much less than if a patterned filter had been used. Further, the structure is much easier to fabricate relative to a device with such a filter.

The backlight can also use the same LEDs as in a side emitting arrangement and in numbers equivalent to that of such backlights. Thus, area LED arrays containing a large number of LEDs, and associated cost, such as in direct and hybrid designs, are not necessary. Thus, this arrangement can be used even for very small displays.

Subsequent embodiments relative to the above embodiments are discussed in reference only to the differences between them and the first embodiment.

Figure 5:
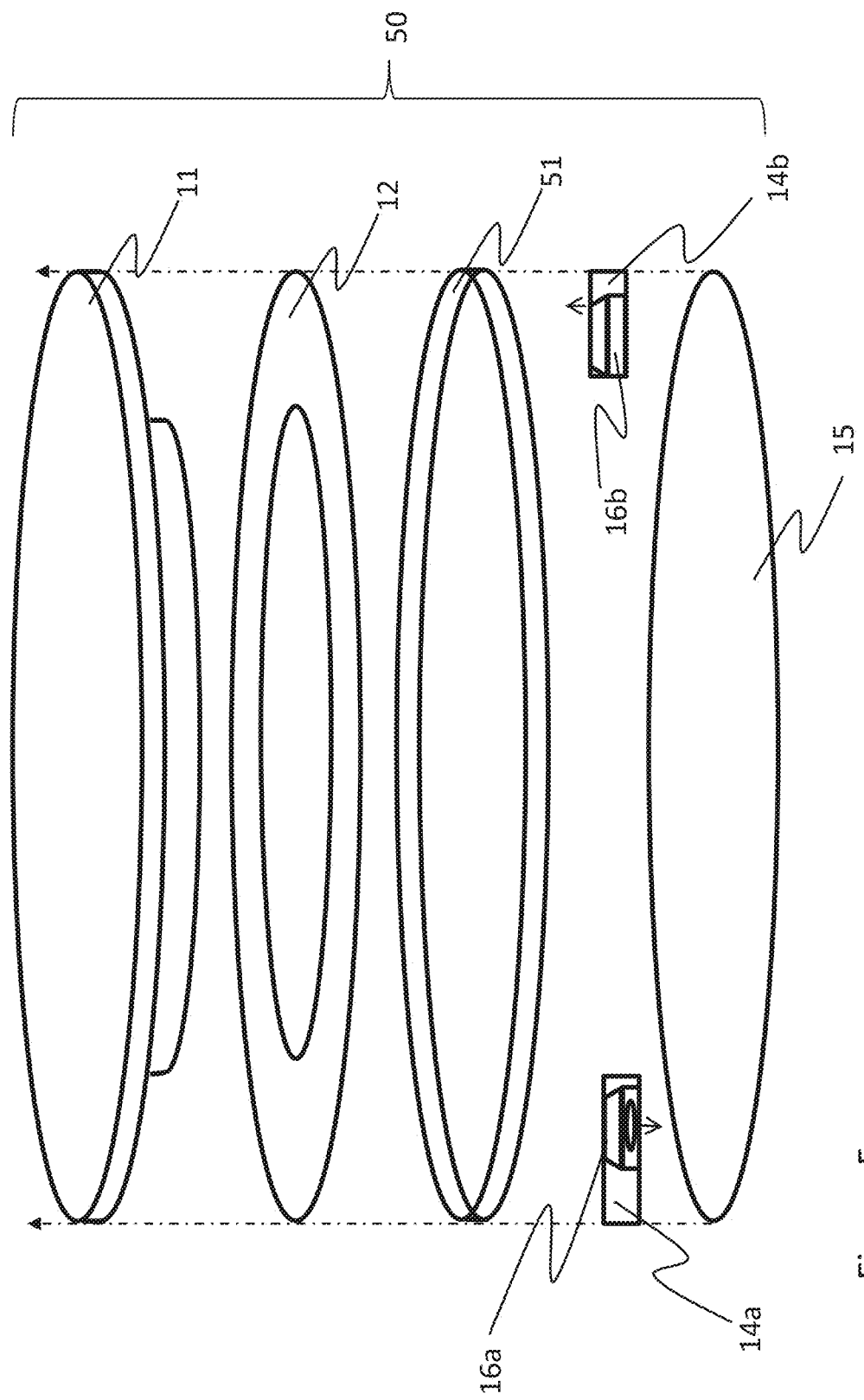
FIG. 5 illustrates and air gap arrangement of a device in accordance with another embodiment of the invention.

FIG. 5 shows another embodiment of a backlight 50 whereby no secondary lightguide is used. In this case the upper and lower reflectors 12, 15 transmit light to the main lightguide in-coupling surface 22. The LEDs 16a and 16b are angled away from the radial direction but are less likely to be directed purely azimuthally in order to minimize efficiency loss. The use of an outer reflecting area (which may be the same or different in type from the upper and lower reflectors) would minimize loss at the edges of the air gap.

Figure 6A:
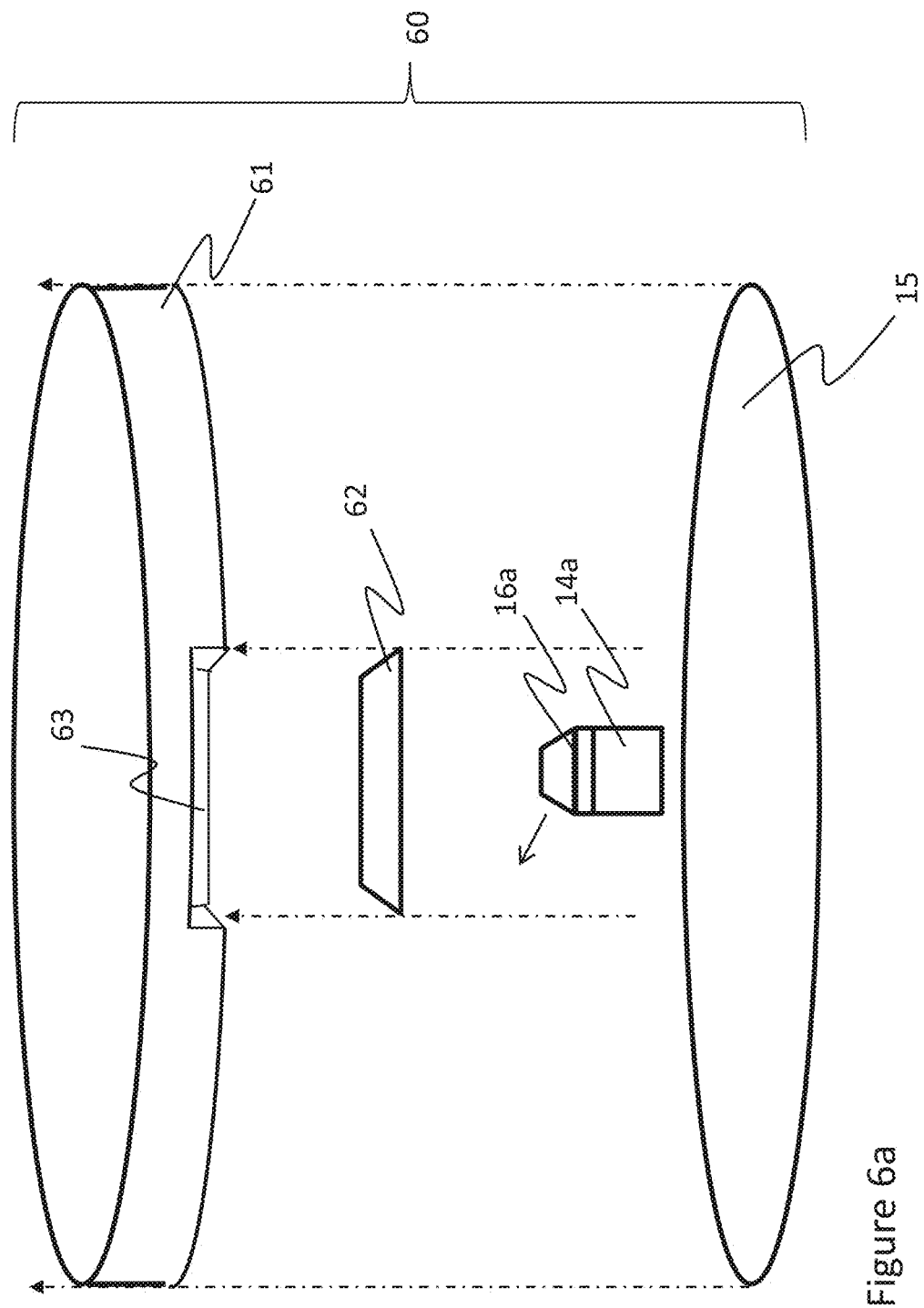

FIG. 6a shows another embodiment of a backlight 60 whereby the main lightguide 61 has a rim 63 only in a small section of the circle around where the LED 16a is positioned. It should be noted that other LEDs in a similar arrangement are assumed but not shown in the figure. The upper reflector 62 will fit the cutaway section above the LED. A secondary lightguide can be used in this part but is not shown. FIG. 6b shows a top-down perspective on the same backlight 60 showing the angled nature of the opposing LEDs 16a, 16b and the cutaway section 63, which may not be to scale.

Figure 7:
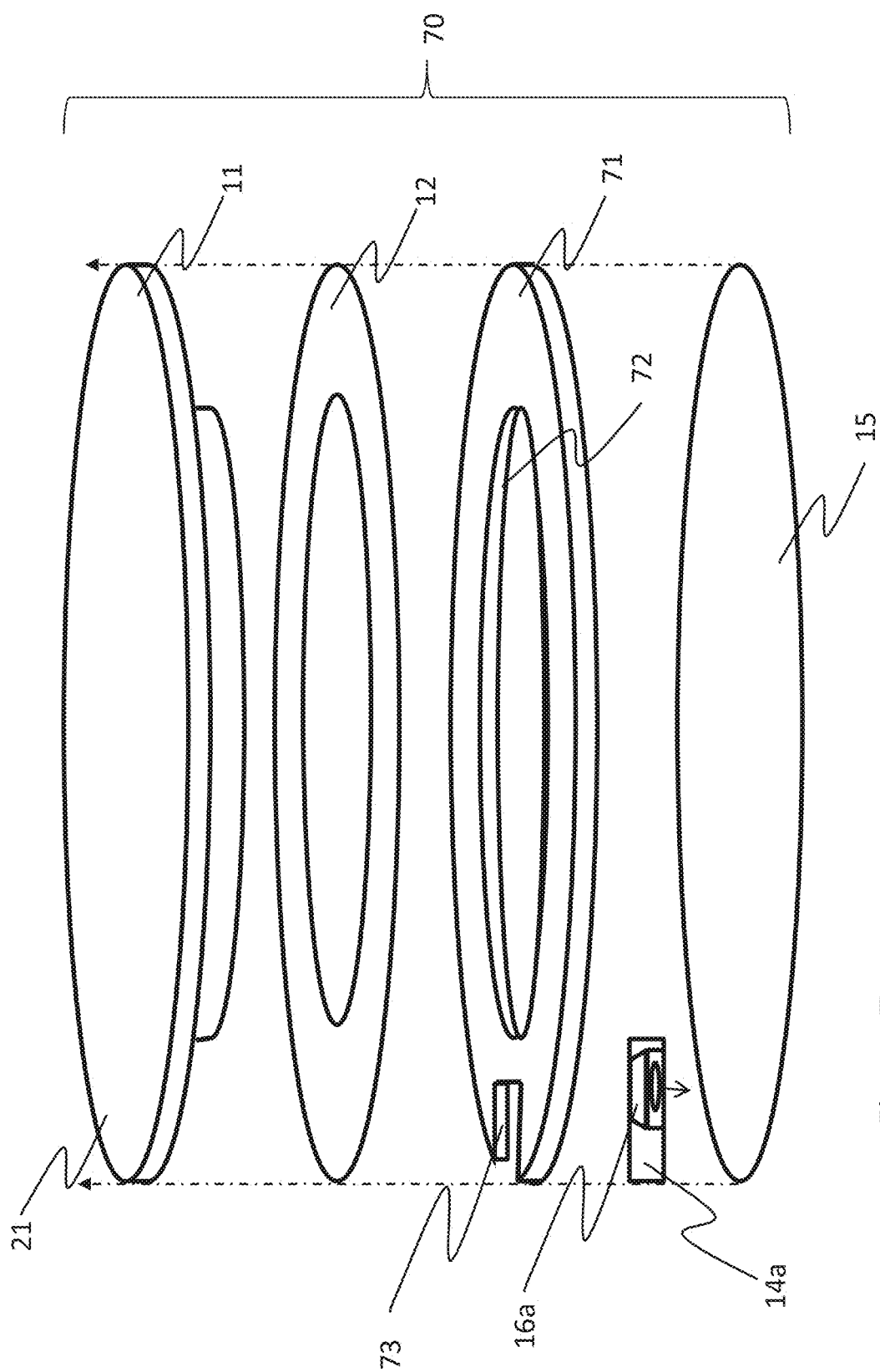
FIG. 7 illustrates a single LED arrangement in accordance with an embodiment of the invention.

FIG. 7 shows an alternative arrangement of a backlight 70 whereby only a single LED 16a is used with a secondary lightguide 71. The LED 16a fits into a cutaway section 73 in a similar manner to the first embodiment. In this case the LED light is in-coupled into the secondary lightguide 71 in such a manner as to propagate around the lightguide and reach at least the opposing side. In this case the inner surface 72 of the secondary lightguide has an arrangement of extraction features that may be densest at the opposite side of the circle from the LED 16a. In this case in-coupling into the main lightguide 11 will be such as the illuminate all the rim areas of the main lightguide.

Figure 8:
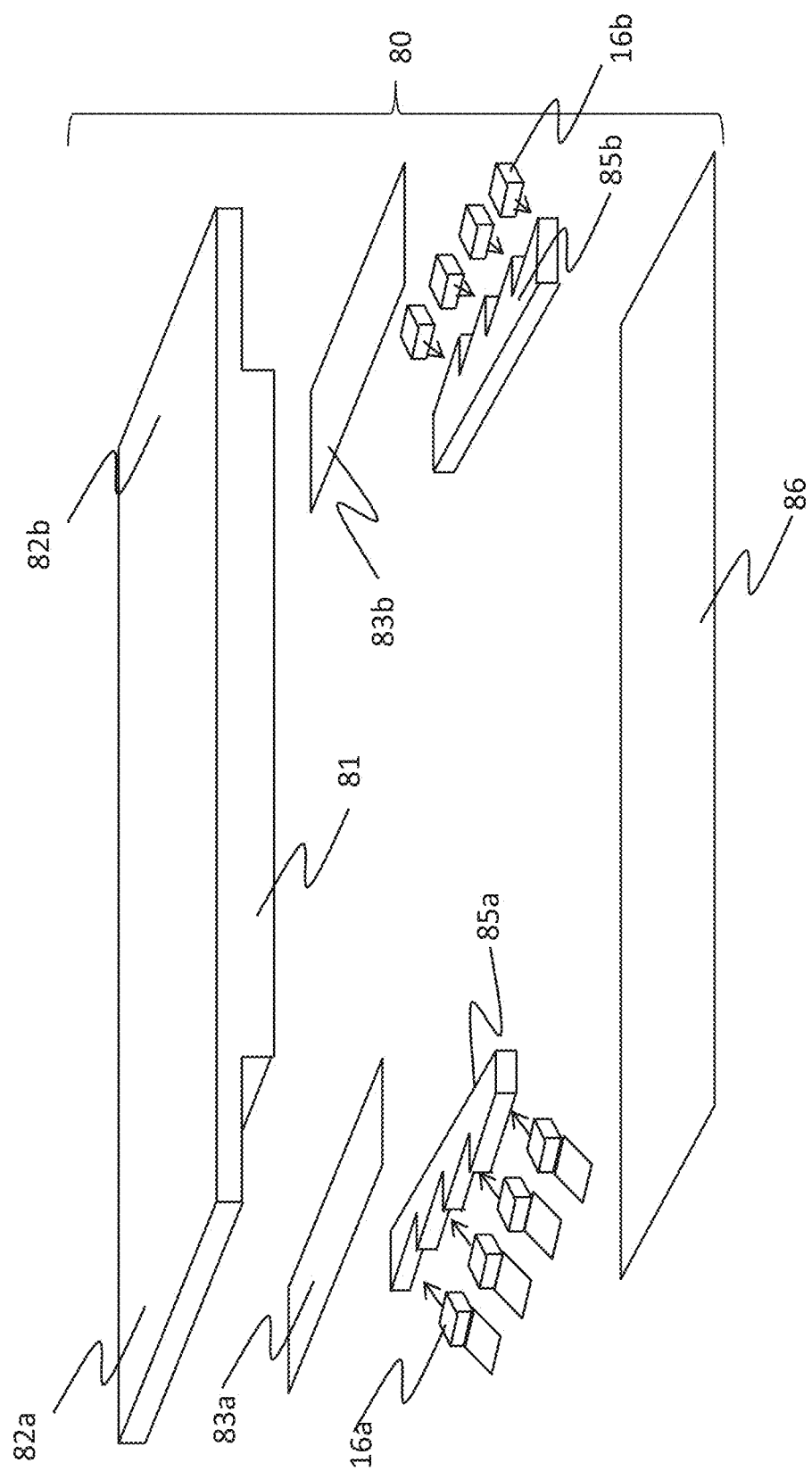
FIG. 8 illustrates a rectangular arrangement with opposing LEDs in accordance with an embodiment of the invention.

FIG. 8 shows yet another embodiment of a backlight 80. The embodiment shown in FIG. 8 includes a rectangular lightguide 81 with two rim sections 82a and 82b on opposite sides of the lightguide. Underneath these rim sections are upper reflectors 83a and 83b. Underneath these reflectors are the secondary lightguides 85a and 85b and two arrays of LEDs 16a and 16b. The lower reflector 86 is such as to be large enough to encompass both rim sections.

Figure 9:
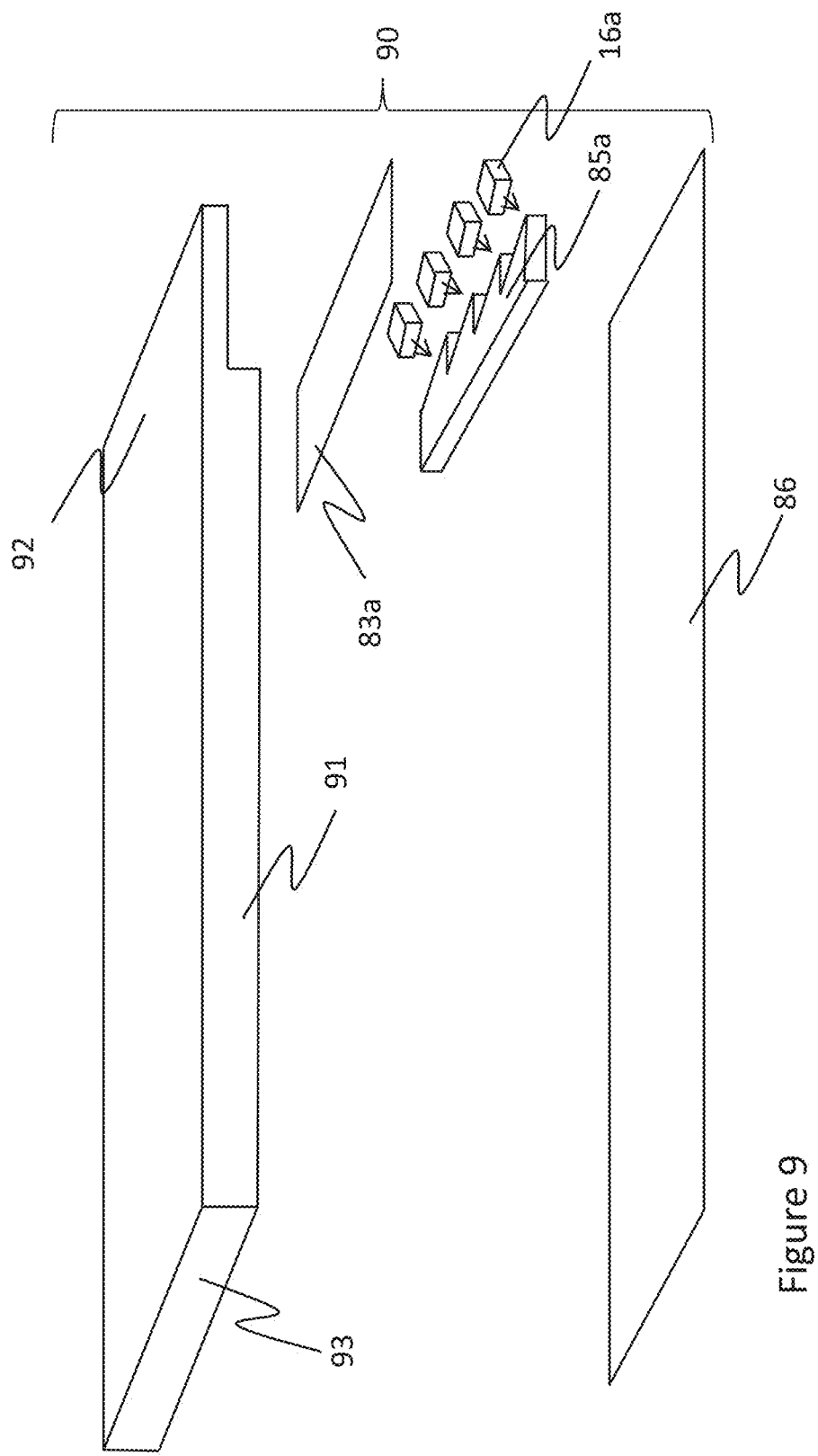
FIG. 9 illustrates a rectangular arrangement with reflectors in accordance with an embodiment of the invention.

FIG. 9 shows an alternative embodiment of a backlight 90 that utilizes a single LED or array of LEDs 16a. The main lightguide 91 then only has a single rim 92 that cannot be illuminated directly from the LEDs. This rim could also be a partial rim, as described, without loss of generality, for the circular lightguide above.

In order to illuminate the rim 92, it is necessary to have some reflecting structure on the opposing surface 93. This can be a reflective layer either in contact with the surface or not in optical contact. The opposing surface 93 can incorporate also a retro-reflecting prism structure, with or without the reflective layer. Guiding lines can also be used to aid collimation in order to aid reflectivity in a known manner. In this way a part of the illuminating light will be transmitted back to the rim in order to be extracted.

The secondary lightguide structures in FIGS. 8 and 9 are designed to reduce the energy density on the in-coupling surface and can be for one or for many LEDs.

Figure 10C:
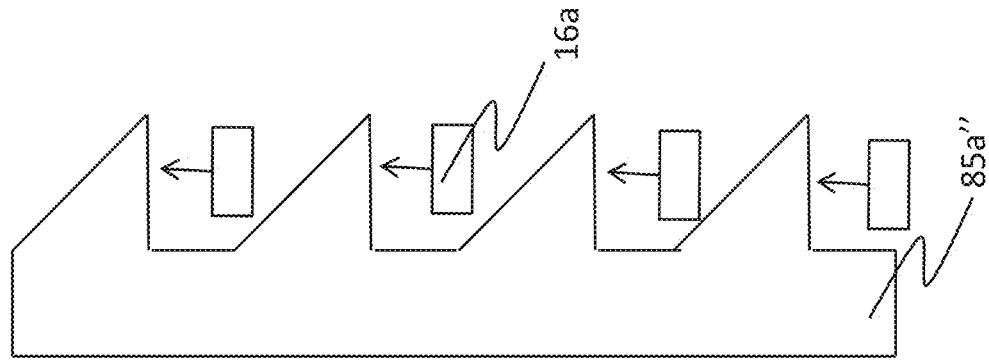
FIGS. 10a, 10b, 10c, 10d and 10e illustrate prism in-coupling structures for the rectangular arrangement in accordance with an embodiment of the invention.
Figure 10B:
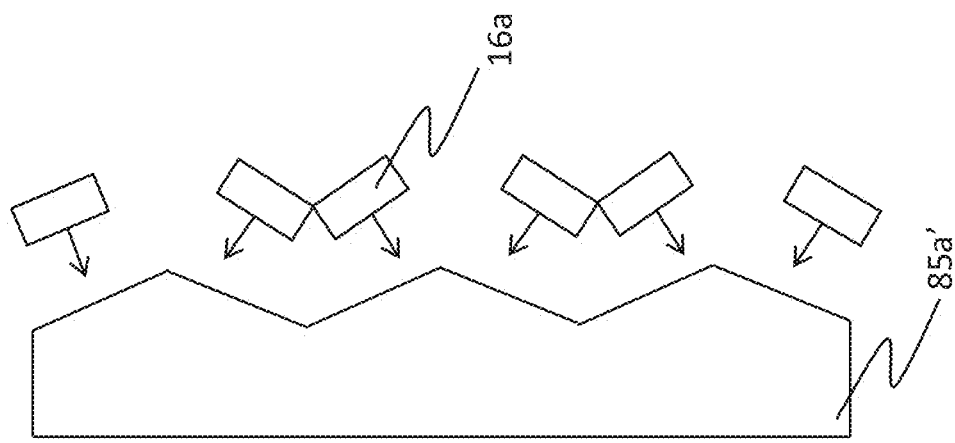
Figure 10A:
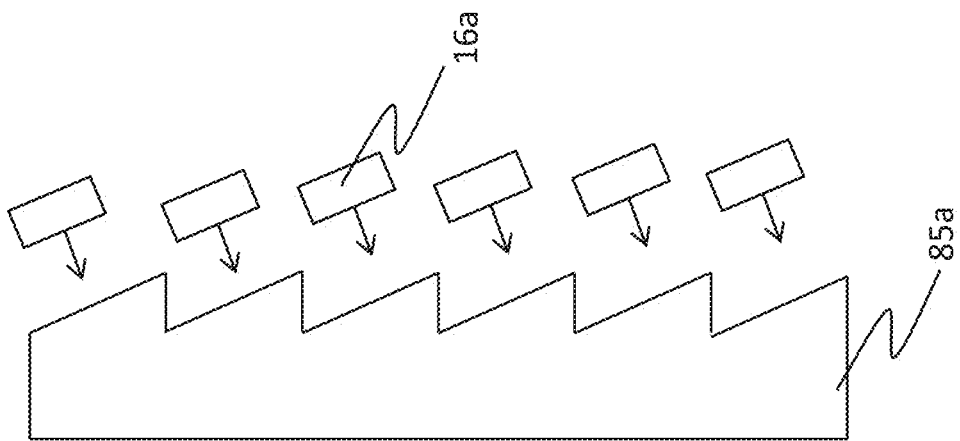

FIG. 10a shows one such design for the secondary reflector 85a where the lightguide has serrated in-coupling features so that the long surface of each can accept light from an LED at an angle to the main in-coupling direction. The LEDs 16a are then arrayed at an angle relative to the lightguide.

FIG. 10b shows an alternative arrangement for the lightguide 85a' where the serrations are alternating in direction so that the LEDs 16a are alternating in direction to meet the sloping faces of the prisms.

FIG. 10c shows an alternative arrangement whereby the in-coupling surfaces are the vertical sections of the serrations, and the sloping edge is used to turn light into the main lightguide as in-coupled from the LEDs 16a.

Figure 10E:
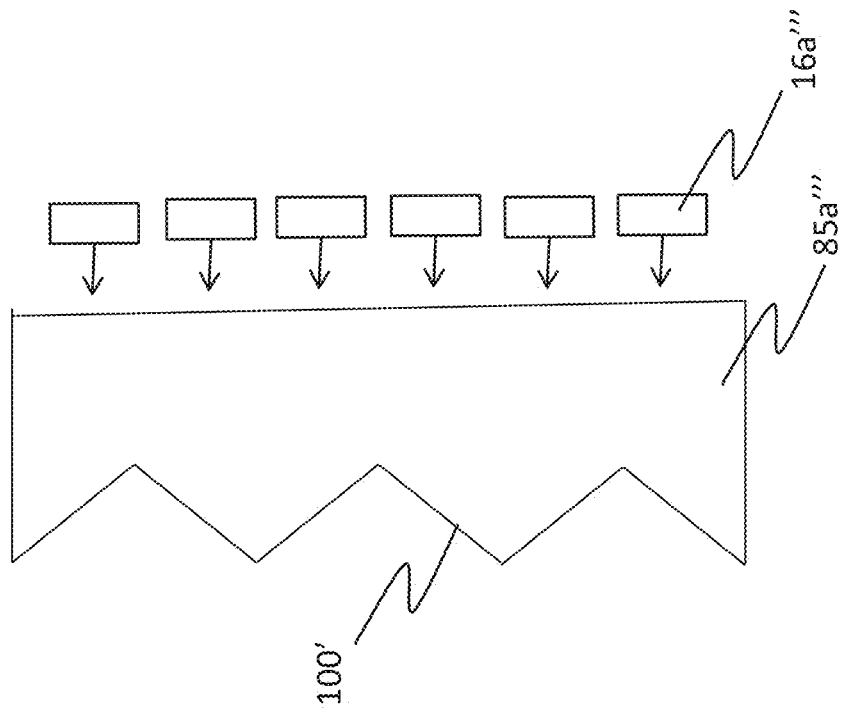
Figure 10D:
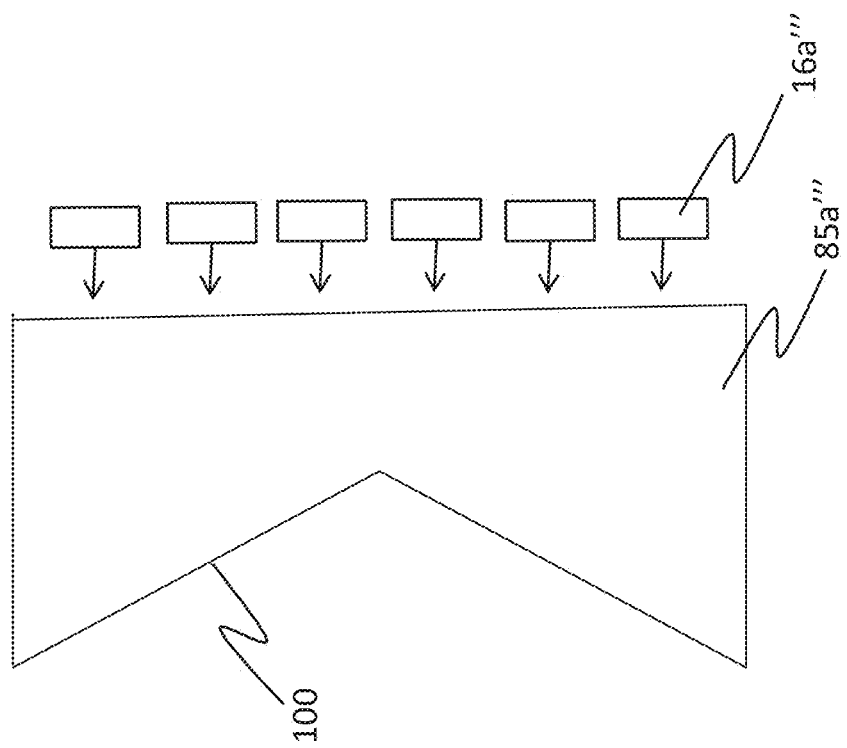

FIG. 10d shows an alternative approach for a secondary lightguide 85a''' where the LEDs 16a are in a straight line shining directly into the main lightguide but the in-coupling surface is angled in order to spread out the interaction area. In this embodiment it is shown as a single V shaped feature 100, but there can be many V shaped features across the length of the lightguide 100', which are shown in FIG. 10e. The energy density across these would be smaller than along a straight line and hence any inaccuracy would be small enough to hide within the normal extraction features.

It is possible to envisage a backlight in this case of arbitrary shape which contains opposing LEDs, or with a single LED and opposing reflective structure of known type. This backlight then uses the techniques of using a cutaway section with and without a secondary lightguide and an upper opaque reflector.

Figure 11:
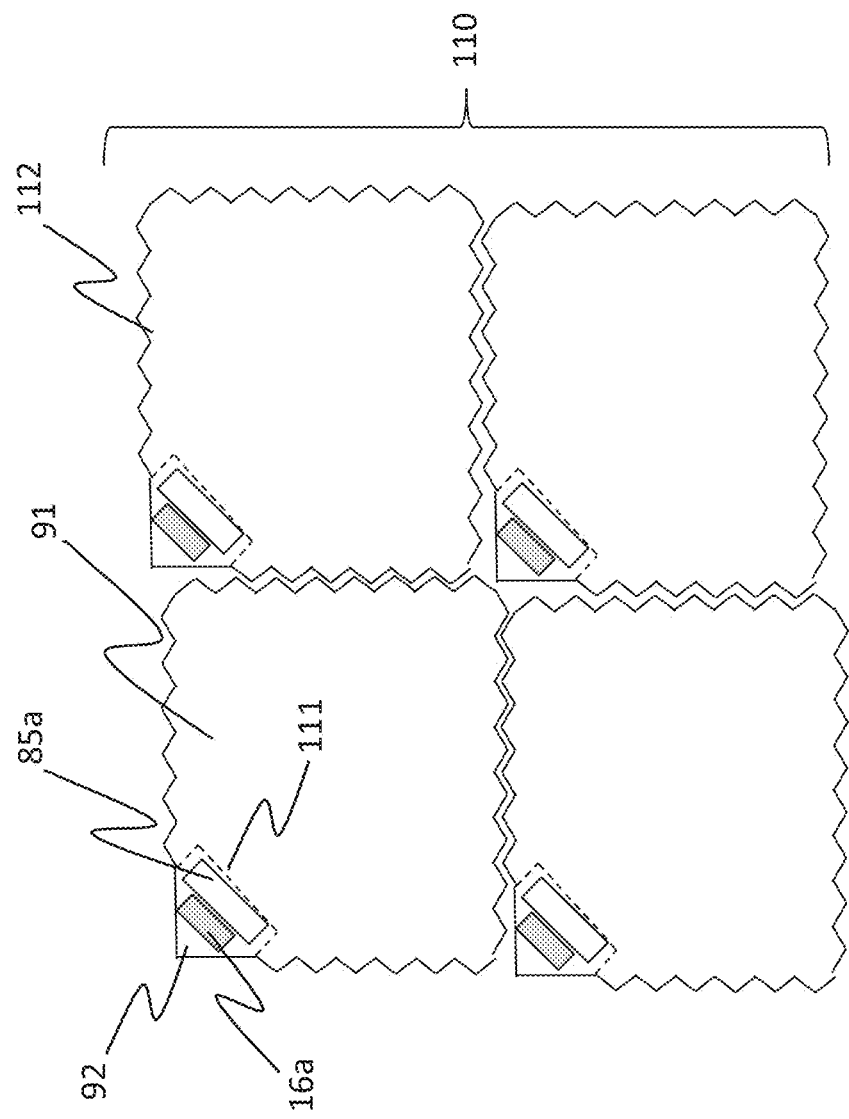
FIG. 11 illustrates a backlight system that includes a plurality of backlights arranged in a tessellating configuration, wherein each light source of the system is independently controllable to enable selective dimming of the backlight system.

FIG. 11 shows an application of the rectangular structure of one embodiment where the low bezel backlight structures can be tiled to create a larger backlight 110 with minimal overlap. In this embodiment the light sources 16a can be placed under the rim 92 and angled relative to the in-coupling surface 111. A secondary lightguide 85a or air gap can be used. The lightguides 91 are then placed in a tessellating format to create the larger lightguide. One or more of the edges 112 on each lightguide can be made with reflecting structures to enable reflected light to pass back into the rim 92 to enable a uniform backlight. The upper and lower reflecting layers and extraction features are present but not shown in the diagram.

The light sources can be independently controlled to allow an "active dimming" backlight where areas on the backlight are selectively dimmed relative to the image content on the display and the image processed accordingly to create a higher contrast ratio for the panel.

Figure 12:
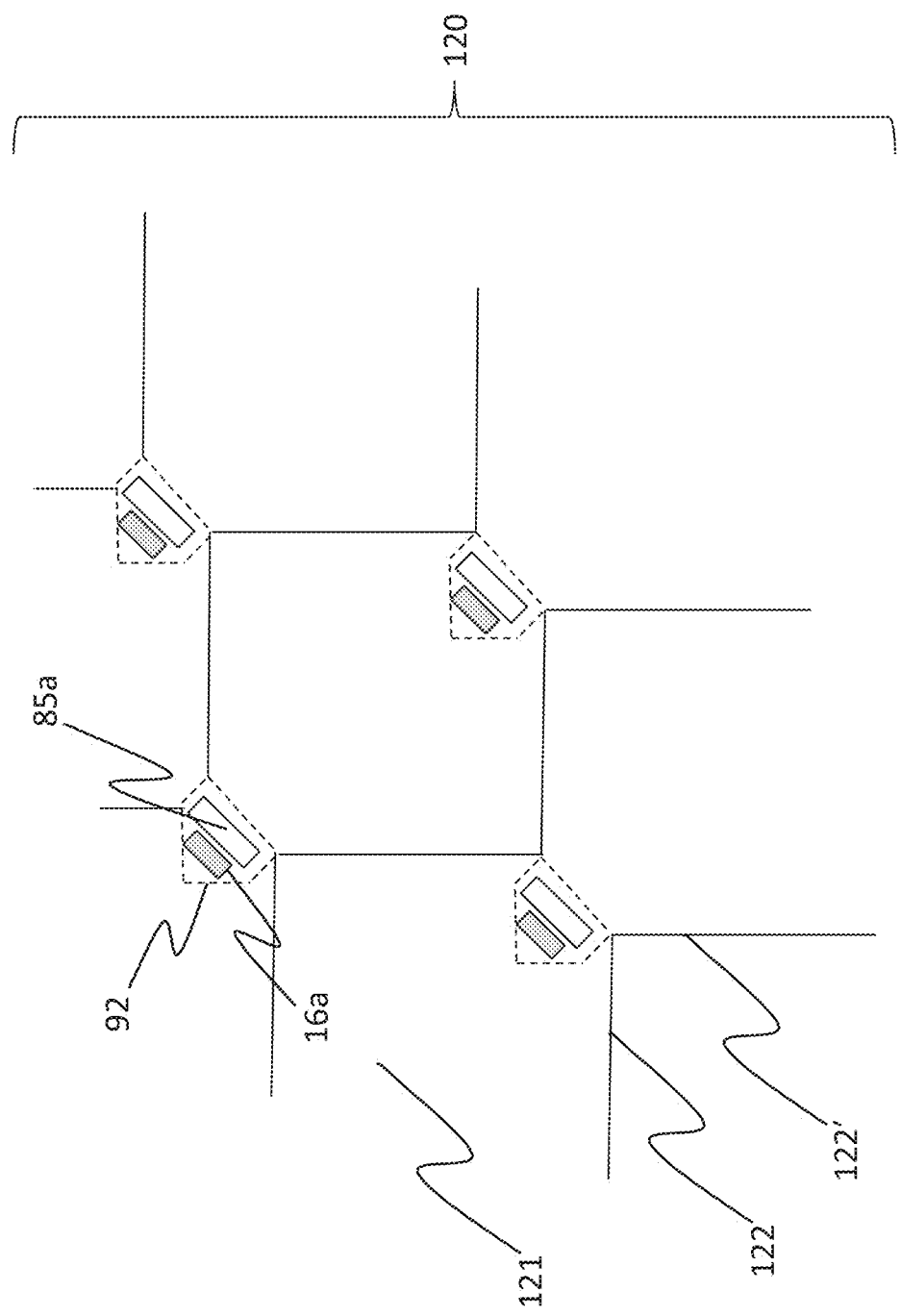
FIG. 12 illustrates another embodiment of a backlight system having selective dimming functionality.

FIG. 12 shows an alternative method of making such an "active dimming" panel. The backlight 120 includes a light source 16a and a secondary lightguide 85a placed under a "rim" area 92 which is a cut out from a single continuous lightguide 121. The upper and lower reflecting layers are present but not shown in the diagram. The lightguide area edges 122 and 122' define the area for each zone in the active backlight but in this embodiment are not separate but continuous lightguide. The area illuminated by each light source 121 is then controlled purely by the extraction feature density in the design. The extraction features are not shown in this diagram.

INDUSTRIAL APPLICABILITY

This invention has particular application in small size and wearable displays to be used with displays that have very low bezel widths. Applications also in smartphone, automotive and larger displays are also possible. Applications in tiled displays and general lighting systems are also possible.

What is claimed is:

1. A backlight, comprising:
   a first lightguide having a first portion and a second portion, wherein the second portion is dimensioned smaller that the first portion so as to form a rim along at least a part of the first light guide; and
   at least one light source positioned under the rim and separated from the first lightguide by a space, a majority of the light emitted by the at least one light source being along a first axis of the at least one light source,
   wherein the at least one light source is arranged to position the at least one axis at an angle away from a center of the lightguide in a plane parallel to the rim.

2. The backlight according to claim 1, wherein the first portion and the second portion are formed as a first cylinder and a second cylinder concentric with the first cylinder, and a diameter of the first cylinder is greater than a diameter of the second cylinder.

3. The backlight according to claim 1, wherein the space comprises air.

4. The backlight according to claim 1, wherein the inner surface comprises extraction features configured to out-couple light from the second lightguide to the first in-coupling surface of the first lightguide.

5. The backlight according to claim 1, wherein the second lightguide comprises at least one cutaway section forming a second in-coupling surface for receiving light from the at least one light source, and the at least one light source is arranged within the cutaway section.

6. The backlight according to claim 1, wherein the first axis of the at least one light source is arranged at an angle relative to a radial center of the second lightguide.

7. The backlight according to claim 1, further comprising:
   a first reflector; and
   a second reflector, wherein the light emitting device is arranged between the first reflector and the second reflector, and the first reflector is arranged between the rim and the at least one light source.

8. The backlight according to claim 1, wherein the at least one light source comprises a plurality of light sources.

9. The backlight according to claim 8, wherein each light source of the plurality of light sources is arranged on a side of the first lightguide opposite another light source of the plurality of light sources.

10. The backlight according to claim 1, wherein a part of the first portion of the first lightguide does not include the rim.

11. The backlight according to claim 1, wherein the first lightguide comprises one of a circular form factor or a rectangular form factor.

12. The backlight according to claim 1, wherein the first lightguide comprises a rectangular form factor having four sides, and the rim comprises a first rim portion arranged on one of the four sides.

13. The backlight according to claim 12, wherein the rim further comprises a second rim portion, the second rim portion arranged on a side of the four sides opposite the first rim portion.

14. The backlight according to claim 1, wherein the second lightguide comprises a serrated surface.

15. The backlight according to claim 14, wherein the serrated surface comprises a first surface and a second surface, the first and second surface sloping in opposite directions.

16. The backlight according to claim 15, wherein the first axis is arranged perpendicular to one of the first surface or the second surface.

17. The backlight according to claim 1, wherein a side of the first lightguide opposing the first light source has either another LED array or a reflecting structure.

18. A backlight system, comprising a plurality of backlights according to claim 1 arranged in a tessellating configuration, wherein the plurality of backlights are independently controllable to enable selective dimming of the backlight system.

* * * * *